(12) United States Patent
Drescher et al.

(10) Patent No.: US 10,274,308 B2
(45) Date of Patent: Apr. 30, 2019

(54) PRECISION OPTICAL HEIGHT GAUGE (71) Applicant: United Technologies Corporation, Farmington, CT (US)

(72) Inventors: Joseph D. Drescher, Middletown, CT (US); Edward Marchitto, Canton, CT (US); Erik M. Pedersen, Chesire, CT (US)

(73) Assignee: United Technologies Corporation, Farminton, CT (US)

( * ) Notice: Subject to any disclaimer, the term of this patent is extended or adjusted under 35 U.S.C. 154(b) by 45 days.

(21) Appl. No.: 15/489,852

(22) Filed: Apr. 18, 2017

(65) Prior Publication Data
US 2018/0299254 A1 Oct. 18, 2018

(51) Int. Cl.
H04N 7/18 (2006.01)
G01B 11/06 (2006.01)
H04N 5/232 (2006.01)
H04N 5/225 (2006.01)
G01B 5/00 (2006.01)

(52) U.S. Cl.
CPC ........ G01B 11/0608 (2013.01); G01B 5/0002 (2013.01); G01B 5/0004 (2013.01); H04N 5/2252 (2013.01); H04N 5/2253 (2013.01); H04N 5/2256 (2013.01); H04N 5/23203 (2013.01); H04N 5/23293 (2013.01); H04N 7/183 (2013.01)

(58) Field of Classification Search
CPC ........... G01B 11/0608; H04N 5/23293; H04N 5/2253; H04N 5/23203; H04N 5/2252; H04N 5/2256; H04N 7/183

USPC ......................................... 348/92, 86, 95, 96
See application file for complete search history.

(56) References Cited

U.S. PATENT DOCUMENTS

| 4,037,325 | A | | 7/1977 | Weber et al. |
| 5,160,839 | A | * | 11/1992 | Nishiyama ......... A63B 24/0021 250/222.1 |
| 6,357,134 | B1 | | 3/2002 | Hama et al. |
| 7,434,331 | B2 | | 10/2008 | Zanier |
| 8,096,061 | B2 | | 1/2012 | Biselx |
| 9,342,743 | B2 | | 5/2016 | Vullioud et al. |
| 2012/0062963 | A1 | | 3/2012 | Gillham et al. |

FOREIGN PATENT DOCUMENTS

| EP | 2667146 | 11/2013 |
| JP | 2008046103 | 2/2008 |
| WO | 9630718 | 10/1996 |

OTHER PUBLICATIONS

European Search Report for Application No. 18168044.8 dated Jun. 13, 2018.

* cited by examiner

Primary Examiner — Robert Chevalier
(74) Attorney, Agent, or Firm — Carlson, Gaskey & Olds, P.C.

(57) ABSTRACT

An optical height gauge including a housing, a mounting bar coupled to, and maintained partially in, the housing, a mounting bracket connected to the mounting bar, the mounting bracket including at least one light source holder, a camera mount connected to the mounting bracket, and a tilt bar connected to the mounting bracket and contacting the mounting bar.

17 Claims, 6 Drawing Sheets

PRECISION OPTICAL HEIGHT GAUGE

TECHNICAL FIELD

The present disclosure relates generally to optical height gauges, and more specifically to a precision optical height gauge.

BACKGROUND

Manufactured components, such as hollow fan blades for utilization in an aircraft, are often constructed under tight tolerances. In some examples, finishing processes during manufacturing are applied to only a portion of the component. In such examples, it is important to ensure that the locations of the finishing on the component are within the specified tolerances. By way of example, some components including the above mentioned hollow fan blades can utilize burnishing with a tight dimensional tolerance on the location of the burnishing.

In order to ensure that completed components fall within the tight dimensional tolerances, the completed components are manually measured using a gauge and visual inspection. Existing processes for performing the manual measurements are challenging, time intensive, and in some cases inaccurate.

SUMMARY OF THE INVENTION

In one exemplary embodiment an optical height gauge includes a housing, a mounting bar coupled to, and maintained partially in, the housing, a mounting bracket connected to the mounting bar, the mounting bracket including at least one light source holder, a camera mount connected to the mounting bracket, and a tilt bar connected to the mounting bracket and contacting the mounting bar.

In another example of the above described optical height gauge the mounting bracket is connected to the mounting bar via a pivoting knob shaft.

In another example of any of the above described optical height gauges the tilt bar has a first orientation and a second orientation, and where the mounting bracket is angled relative to the length of the mounting bar while the tilt bar is in the second orientation.

In another example of any of the above described optical height gauges the mounting bracket is angled approximately seven degrees relative to the length of the mounting bar while the tilt bar is in the second orientation.

In another example of any of the above described optical height gauges the housing comprises two components joined via at least one press fit connector.

In another example of any of the above described optical height gauges the mounting bracket includes two light source holders.

In another example of any of the above described optical height gauges the camera mount is disposed between the light source holders.

Another example of any of the above described optical height gauges, further includes a video camera mounted in the camera mount, the video camera being connected to a remote display.

In another example of any of the above described optical height gauges the remote display includes a computer and a monitor, the computer including a memory storing instructions for operating an auxiliary data acquisition system and for operating a user interface control for the video camera.

In another example of any of the above described optical height gauges the mounting bar is connected to a precision height stand.

In another example of any of the above described optical height gauges the precision height stand is precise to at least within 0.0005 inch (0.0127 mm) in an inches setting or 0.01 mm (0.00039 inches) in a millimeters setting.

In one exemplary embodiment a measurement system includes an optical height gauge having a housing, a mounting bar coupled to, and maintained partially in, the housing, a mounting bracket connected to the mounting bar, the mounting bracket including at least one light source holder, a camera mount connected to the mounting bracket, and a tilt bar connected to the mounting bracket and contacting the mounting bar, a precision height stand, wherein the optical height gauge is mounted to the precision height stand, and a video camera disposed in the camera mount, and communicatively coupled to a computer system.

Another example of the above described measurement system further includes at least one LED array disposed in the at least one light source holder, wherein the at least one LED array is configured to illuminate a focal point of the camera.

In another example of any of the above described measurement systems the computer system includes a control module configured to control camera functions of the camera.

In another example of any of the above described measurement systems the camera functions include digital enhancement tools.

In another example of any of the above described measurement systems the computer system includes a display and a user interface configured to allow a user to operate the camera.

In another example of any of the above described measurement systems the user interface includes a digital image window and a crosshair overlay is positioned in the digital image window.

An exemplary method for determining a height measurement includes magnifying a digital image provided by an optical height gauge using a user interface, identifying a precise height on a surface in the magnified digital image using the optical height gauge, and capturing the measurement using a computer system communicatively coupled to the optical height gauge.

In another example of the above described exemplary method for determining a height measurement the optical height gauge includes a housing, a mounting bar coupled to, and maintained partially in, the housing, a mounting bracket connected to the mounting bar, the mounting bracket including at least one LED array holder, a camera mount connected to the mounting bracket, and a tilt bar connected to the mounting bracket and contacting the mounting bar.

Another example of any of the above described exemplary methods for determining a height measurement further includes angling the optical height gauge relative to a mounting bar using a tilt bar interfaced with a mounting bracket and the mounting bar.

These and other features of the present invention can be best understood from the following specification and drawings, the following of which is a brief description.

DETAILED DESCRIPTION OF AN EMBODIMENT

Figure 1:
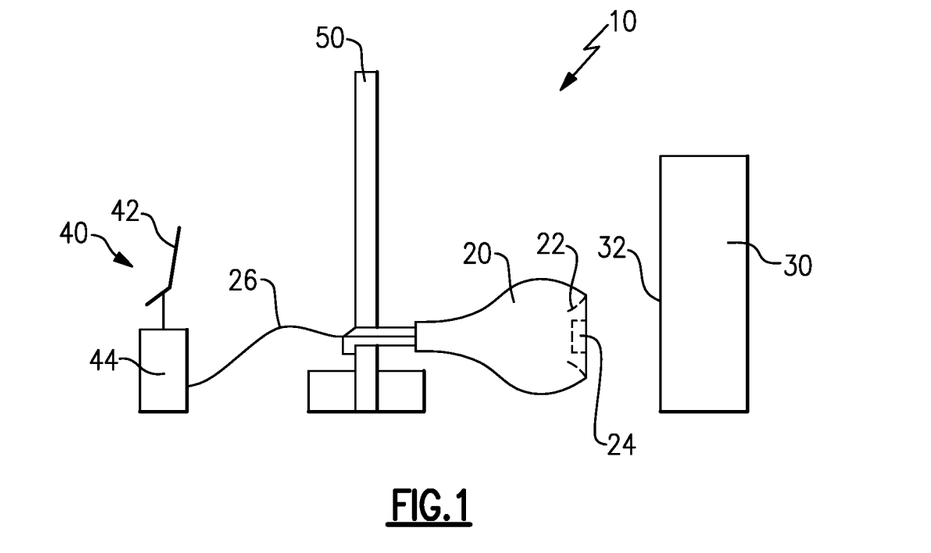
FIG. 1 schematically illustrates a measurement system including an optical height gauge.

FIG. 1 schematically illustrates a measurement system 10 including an optical height gauge 20. The optical height gauge 20 includes at least one LED array 22 configured to illuminate a surface 32 that is being viewed through the height gauge 20. Also included within the height gauge 20 is a camera 24. The camera 24 digitally captures the surface 32 and provides a video image signal through a wire 26 to a display system 40. By way of example, the display system 40 can be a personal computer, a television screen, or another device capable of digitally displaying the video image captured by the camera 24. In alternate examples, the wire 26 can be replaced via any other form of digital communication including wireless transmissions.

The height gauge 20 is mounted to a precision height stand 50. The precision height stand 50 can be a commercially available height stand, or a custom height stand, depending on the specific needs of a given measurement system. In some examples, the precision height stand 50 is configured to be precise to within 0.0005 inch (0.0127 mm) in an inches setting or 0.01 mm (0.00039 inches) in a millimeters setting. In alternative examples, height stands with greater, or lesser, precision can be utilized depending on the tolerance requirements of the component 30 being viewed.

The display system 40 allows a user, such as a technician, to view the digitally captured video image using a screen 42. The display system 40 can include a user interface configured to run on a dedicated computer 44. After initial installation, the user interface on the computer 44 is configured to control the settings, such as brightness, of the LED arrays 22 and the settings of the camera 24, for each measurement location. The display system 40 can include magnification features, a crosshair overlay, and other digital enhancement tools designed to allow the user to more precisely measure features of the surface 32 of the component 30.

By using the optical height gauge 20 on a precision height stand 50, the user can ensure that the same precise measurement is made on each component 30 that is being measured, and variations resulting from different operators taking the measurements are minimized. In one exemplary embodiment, the user utilizes the optical height gauge 20 in combination with the screen 42 to precisely position the optical height gauge 20 at a dividing line between a burnished portions of the surface 32 and an unburnished portion of the surface 32. A measurement is then taken along the precision height stand 50, indicating the height of the optical height guide 20. The height of the optical height guide directly corresponds to the height on the surface 32 of the border between the burnished and unburnished portion and a precise measurement of the surface 32 is acquired.

Further, the computer 44 can include software allowing the user to record multiple measurements of a given component 30, and generate an inspection report including all relevant measurements. In further examples, the computer 44 can automatically transmit the inspection report to a quality recording system, a process control reporting system, or any other system.

Figure 2:
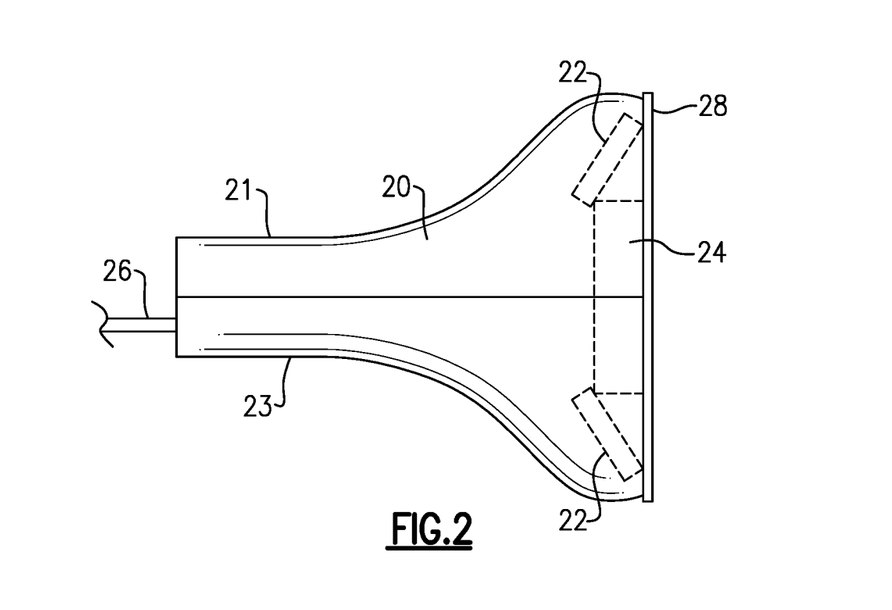
FIG. 2 schematically illustrates the optical height gauge of FIG. 1, isolated from the measurement system.

With continued reference to FIG. 1, FIG. 2 schematically illustrates the exemplary height gauge 20 of FIG. 1 in greater detail, and removed from the context of the measurement system 10. In the exemplary optical height gauge 20, a housing includes a top portion 21 and a bottom portion 23. The housing encompasses a camera 24, and multiple LED arrays 22. A grommet 28 is disposed on an end of the housing, and assists in maintaining the relative positions of the two housing portions 21, 23. In some examples, the grommet 28 can include a clear lens, thereby sealing the housing.

Figure 3:
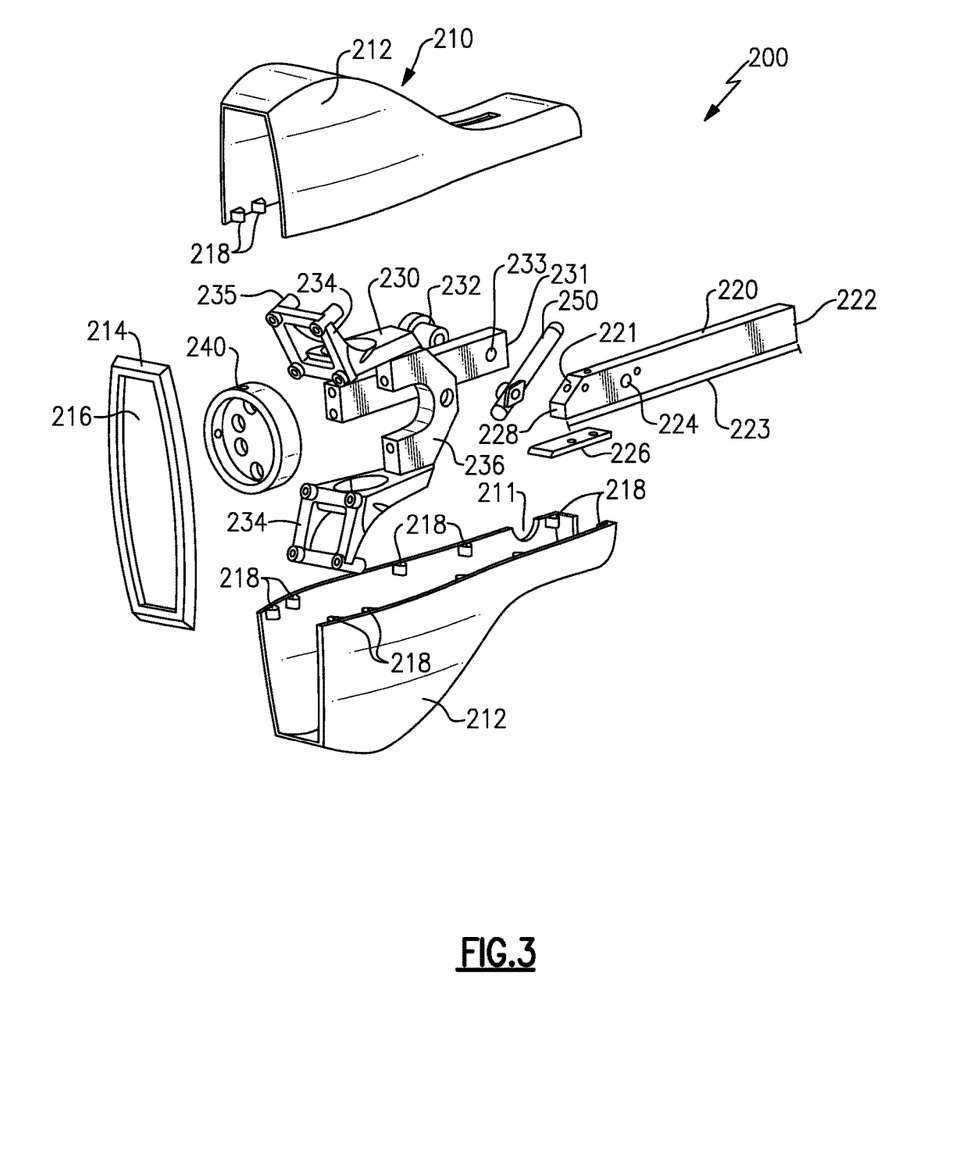
FIG. 3 schematically illustrates an exploded view of the optical height gauge.

With continued reference to the examples of FIGS. 1 and 2, FIG. 3 schematically illustrates an exploded view of an exemplary optical height gauge 200, such as the height gauge 20 of FIGS. 1 and 2. Further, with reference to FIG. 3, FIGS. 4A-4D schematically illustrate the housing 210 (FIG. 4A), mounting bar 220 (FIG. 4B), mounting bracket 230 and camera mount 240 (FIG. 4C) and the tilt bar 250 (FIG. 4D) isolated from the remainder of the optical height gauge 200.

Figure 4A:
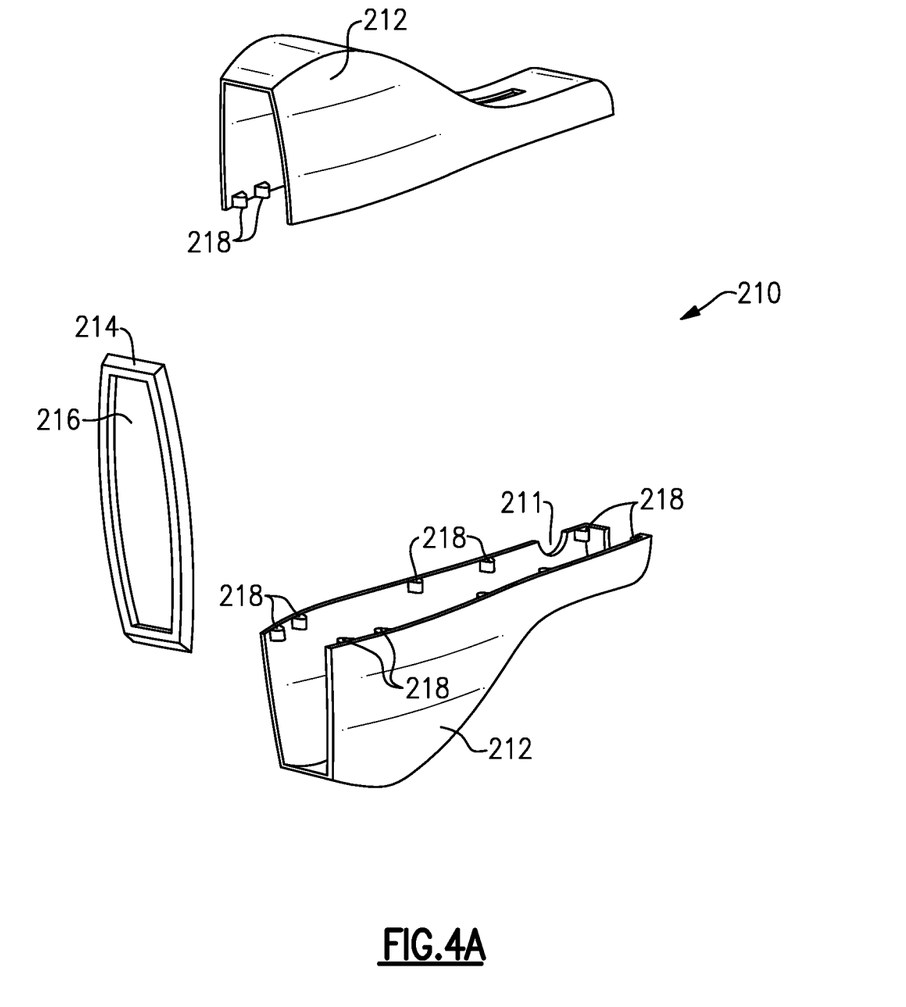
FIG. 4A schematically illustrates a housing portion of an optical height gauge.

The housing 210 includes two housing portions 212, and a grommet 214. In some examples, the grommet 214 includes an opening 216. In alternative examples, a clear lens is included at the opening, thereby allowing the housing to be completely sealed against environmental conditions. The exemplary housing portions 212 are connected via multiple press fit posts included in connector features 218. In alternative examples, any other connection capable of at least partially joining the two housing portions 212 can be utilized in place of the press fit connector features 218. Each of the housing portions 212 includes a rear opening 211. The rear openings 211 combine, in an assembled state, to provide a through hole allowing an adjustor knob 232 connected to the mounting bracket 230 to pass through the housing 210.

Figure 4B:
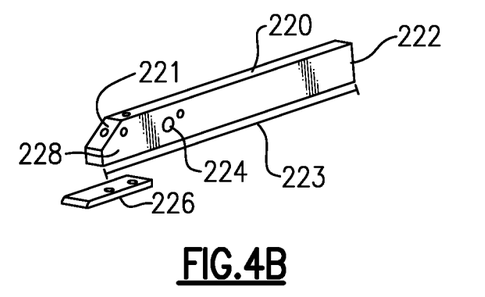
FIG. 4B schematically illustrates a mounting bar of an optical height gauge.

Extending partially into the housing 210 is a mounting bar 220. The mounting bar 220 connects at a first end 222 to the precision height stand 50 (see FIG. 1), and includes interconnect features 224, 226 at a second end 228 for interconnecting with the mounting bracket 230. Also included at the second end 228, is a tilt surface 221. The tilt surface 221 is angled relative to a length 223 of the mounting bar 220. The tilt surface 221 interfaces with a tilt bar 250 within the optical height gauge 200 and is configured to allow the angle of the mounting bracket 230, relative to the mounting bar 220, to be adjusted. In some examples, the angle can be adjusted by up to seven degrees. In yet further examples, the angle can be adjusted by a single amount, and positions the mounting bracket 230 at either no angle relative to the mounting bar 220, or a seven degree angle relative to the mounting bar 220.

Figure 4C:
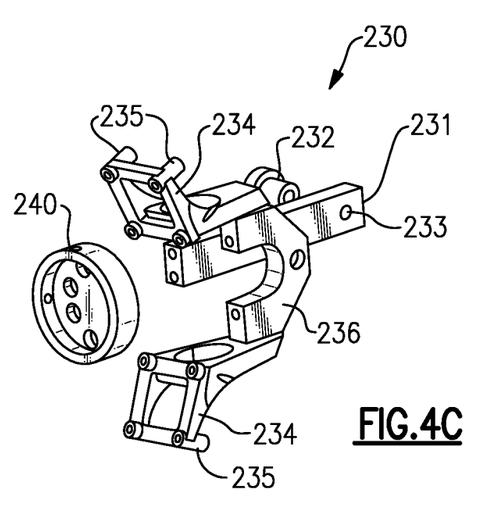
FIG. 4C schematically illustrates a mounting bracket of an optical height gauge.

The mounting bracket 230 is connected to the mounting bar 220 at a first end 231 via the adjustor knob 232, and is supported by the plate interconnect feature 226. The adjustor knob 232 protrudes through a hole 233 in the mounting bracket, and a corresponding hole portion of the interconnect feature 224. Supported on an opposite end of the mounting bracket 230 are multiple LED array mounts 234, and a U-shaped fixture 236. A camera mount 240 is connected to the U-shaped fixture 236 via any suitable fastener, including screws, bolts, and the like. While illustrated in the instant example as a circular camera mount 240, the camera mount 240 can be any suitable shape for a designated digital camera, depending on the needs of the specific system.

Each of the LED array mounts 234 includes fastener holes 235 for receiving and mounting a corresponding LED array. The LED array mounts 234 are angled to focus the light from the LED arrays at a fixed point directly in front of a camera in the camera mount 240. During operation, the fixed point is positioned on the surface being measured, and the LED arrays provide illumination for the camera. While illustrated in the exemplary embodiment as including two LED array mounts 234, one of skill in the art could modify the structure of the mounting bracket 230 to include one LED array mount 234, three LED array mounts 234, or any number of suitable LED array mounts, depending on the amount of illumination needed for a given application of the optical height gauge.

Figure 4D:
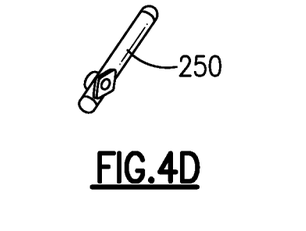
FIG. 4D schematically illustrates a tilt bar of an optical height gauge.

Also included within the housing 210 is a tilt bar 250. The tilt bar 250 is interconnected with the mounting bracket 230, and interfaces with the mounting bar 220. The tilt bar 216 is configured to position the mounting bracket 230 aligned with the mounting bar 220 in a first state, and angled relative to the mounting bar 220 in a second state.

Figure 5A:
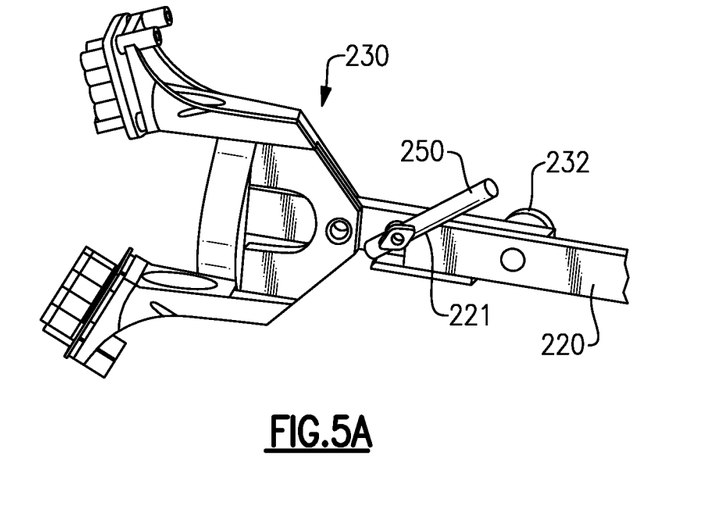
FIG. 5A schematically illustrates an optical height gauge while a tilt bar is in a first position.
Figure 5B:
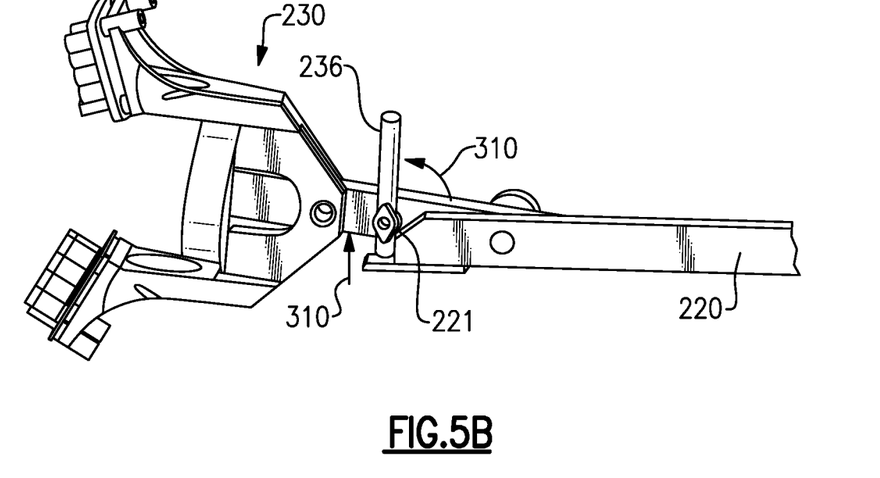
FIG. 5B schematically illustrates an optical height gauge while a tilt bar is in a second position.

With continued reference to FIGS. 3-4D, and with like numerals indicating like elements, FIGS. 5A and 5B illustrate the orientation of the mounting bracket 230, relative to the mounting bar 220 in a first state (FIG. 5A) and a second state (FIG. 5B). While in the first state, FIG. 5A, the tilt bar 250 rests against the tilt surface 221 of the mounting bar 220. In this position, the mounting bracket 230 is maintained in line with the length of the mounting bar 220. When a user, or other height gauge operator, loosens the knob 232, by rotating the knob 232, and tilts the tilt bar 250 to rotate into the second position (FIG. 5B) along movement arrows 310, the mounting bracket 230 pivots at the knob 232, causing the bracket to shift upwards. An end surface of the mounting bar 220 prevents the tilt bar 250 from rotating further than illustrated, and limits the angle by which the mounting bracket 230 can be angled.

To return the mounting bracket to the aligned position, the knob 232 is loosened by rotating the knob 232, and the mounting bracket returns to the first position via a camming action. Upon coming into contact with the tilt surface 221, the tilt bar 250 prevents the mounting bracket 230 from extending beyond the predetermined angle. In the illustrated example, the angle is seven degrees. One of skill in the art will understand that this angle can be altered, by adjusting the relative dimensions of the tilt bar, the tilt surface, and the position of the knob along the length of the mounting bar 220, and depending on the needs of the corresponding system.

With continued reference to FIGS. 1-5B, FIG. 6 illustrates an exemplary user interface 600, such as could be displayed on the screen 42 of the measurement system 10 of FIG. 1. A user operating the measurement system 10 can interact with the user interface using any number of known interfaces including a keyboard, a mouse, a touchscreen, any other known interface tool, or any combination of interface tools.

Figure 6:
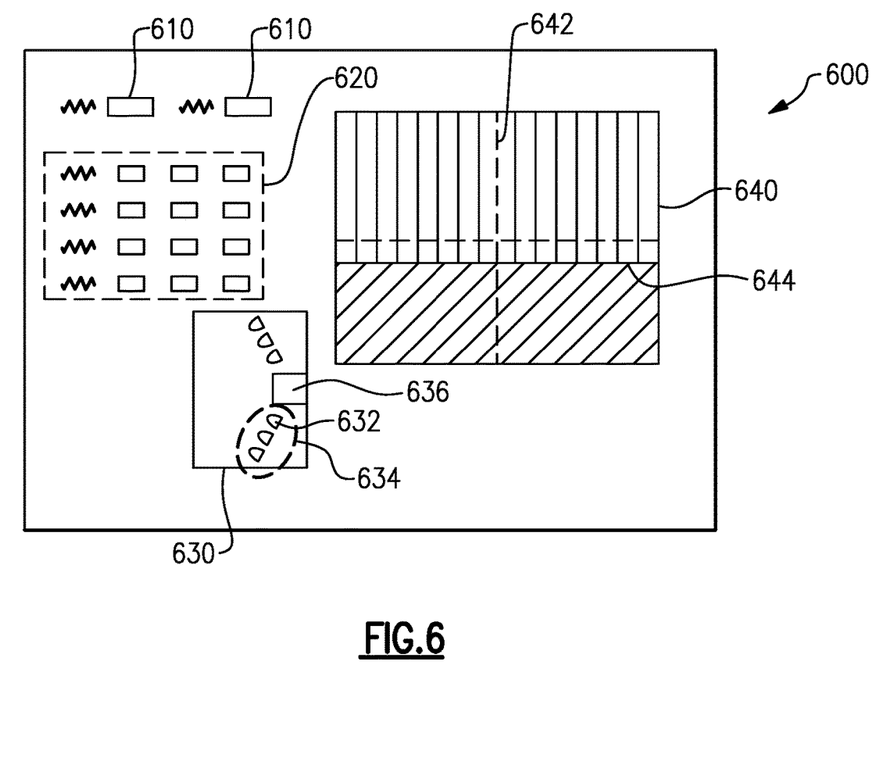
FIG. 6 schematically illustrates an exemplary user interface for the measurement system of FIG. 1.

Included within the user interface 600 is a set of capture information input fields 610 which allow the user to enter data related to the part being captured and/or the specific dimension being measured. This data can then be utilized to generate an automatic report, or provide information with regards to saved details when the capture is retrieved at a later date.

Also included in the display are multiple measurement entries 620. The measurement entries 620 display the current measurement details of the optical height gauge 20, and can include pressure on the height gauge, height of a crosshair, leading edge height, or any other determined information. When a measurement is captured, the measurement entries 620 form the detailed measurement and provide the information required by the user.

Also included in the user interface 600 is a camera control window 630. The camera control window 630 displays information related to each individual LED 632 within each of the LED arrays 634, as well as details of the camera 636. Through the addition of interface features such as buttons, sliders, text fields, or other programmatic controls, the user can directly control each LED 632 in a given LED array 634 thereby controlling the brightness and focus of the LED arrays 634.

Also included in the user interface is a video window 640. The video window 640 is a window display that provides a digital view of the image being captured by the camera 24 in the optical height gauge. The video window 640 can, in some examples, include a crosshair overlay 642 allowing the user to visually match a centerpoint of the optical height gauge 20 with a line 644 distinguishing between a burnished zone and a non-burnished zone of the part being measured. Alternative camera control features including magnification, exposure duration, gain, or other digital enhancement tools can be further included within the video window 640.

With reference to all the identified features of the user interface 600, one of skill in the art will understand that the illustrated positions of the various elements are exemplary only and alternative user interfaces re-arranging the positions of the visual elements on the user interface fall within the scope of the present disclosure.

In examples utilizing the above described user interface 600, inputs and control signals can be generated by the user interface and provided to the optical height gauge 20 through a communicative coupling, such as the wire 26.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. An optical height gauge comprising:
a housing;
a mounting bar coupled to, and maintained partially in, the housing;
a mounting bracket connected to the mounting bar via a pivoting knob shaft, the mounting bracket including at least one light source holder;
a camera mount connected to the mounting bracket; and
a tilt bar connected to said mounting bracket and contacting said mounting bar, the tilt bar having a first orientation and a second orientation, and the mounting bracket being angled relative to the length of the mounting bar while the tilt bar is in the second orientation.

2. The optical height gauge of claim 1, wherein the mounting bracket is angled approximately seven degrees relative to the length of the mounting bar while said tilt bar is in the second orientation.

3. The optical height gauge of claim 1, wherein the housing comprises two components joined via at least one press fit connector.

4. The optical height gauge of claim 1, wherein the mounting bracket includes two light source holders.

5. The optical height gauge of claim 4, wherein the camera mount is disposed between the light source holders.

6. The optical height gauge of claim 1, further comprising a video camera mounted in said camera mount, the video camera being connected to a remote display.

7. An optical height gauge comprising:
a housing;
a mounting bar coupled to, and maintained partially in, the housing;
a mounting bracket connected to the mounting bar, the mounting bracket including at least one light source holder;
a camera mount connected to the mounting bracket;
a tilt bar connected to said mounting bracket and contacting said mounting bar; and
a video camera mounted in said camera mount, the video camera being connected to a remote display wherein the remote display includes a computer and a monitor, the computer including a memory storing instructions for operating an auxiliary data acquisition system and for operating a user interface control for said video camera.

8. The optical height gauge of claim 1, wherein the mounting bar is connected to a precision height stand.

9. An optical height gauge comprising:
a housing;
a mounting bar coupled to, and maintained partially in, the housing, the mounting bar being connected to a precision height stand, the precision height stand being precise to at least within 0.0005 inch (0.0127 mm) in an inches setting or 0.01 mm (0.00039 inches) in a millimeters setting;
a mounting bracket connected to the mounting bar, the mounting bracket including at least one light source holder;
a camera mount connected to the mounting bracket;
a tilt bar connected to said mounting bracket and contacting said mounting bar.

10. A measurement system comprising:
an optical height gauge having a housing, a mounting bar coupled to, and maintained partially in, the housing, a mounting bracket connected to the mounting bar, the mounting bracket including at least one light source holder including at least one LED array, a camera mount connected to the mounting bracket, and a tilt bar connected to said mounting bracket and contacting said mounting bar;
a precision height stand, wherein the optical height gauge is mounted to the precision height stand;
a video camera disposed in said camera mount, and communicatively coupled to a computer system; and
wherein the LED array is configured to illuminate a focal point of the video camera.

11. The measurement system of claim 10, wherein said computer system includes a control module configured to control camera functions of said camera.

12. The measurement system of claim 10, wherein said camera functions include digital enhancement tools.

13. The measurement system of claim 10, wherein said computer system includes a display and a user interface configured to allow a user to operate said camera.

14. A measurement system comprising:
an optical height gauge having a housing, a mounting bar coupled to, and maintained partially in, the housing, a mounting bracket connected to the mounting bar, the mounting bracket including at least one light source holder, a camera mount connected to the mounting bracket, and a tilt bar connected to said mounting bracket and contacting said mounting bar;
a precision height stand, wherein the optical height gauge is mounted to the precision height stand; and
a video camera disposed in said camera mount, and communicatively coupled to a computer system including a display and a user interface configured to allow a user to operate said camera, wherein the user interface includes a digital image window and a crosshair overlay is positioned in said digital image window.

15. A method for determining a height measurement comprising:
magnifying a digital image provided by an optical height gauge using a user interface;
identifying a precise height on a surface in said magnified digital image using the optical height gauge; and
capturing the measurement using a computer system communicatively coupled to the optical height gauge.

16. The method of claim 15, wherein the optical height gauge includes a housing, a mounting bar coupled to, and maintained partially in, the housing, a mounting bracket connected to the mounting bar, the mounting bracket including at least one LED array holder, a camera mount connected to the mounting bracket, and a tilt bar connected to said mounting bracket and contacting said mounting bar.

17. The method of claim 15, further comprising angling the optical height gauge relative to a mounting bar using a tilt bar interfaced with a mounting bracket and the mounting bar.

* * * * *